Dec. 13, 1960    R. G. WHITE    2,964,351
ADJUSTABLE LICENSE PLATE ASSEMBLY
Filed Aug. 25, 1958    2 Sheets-Sheet 1

INVENTOR.
Richard G. White
BY
ATTORNEY

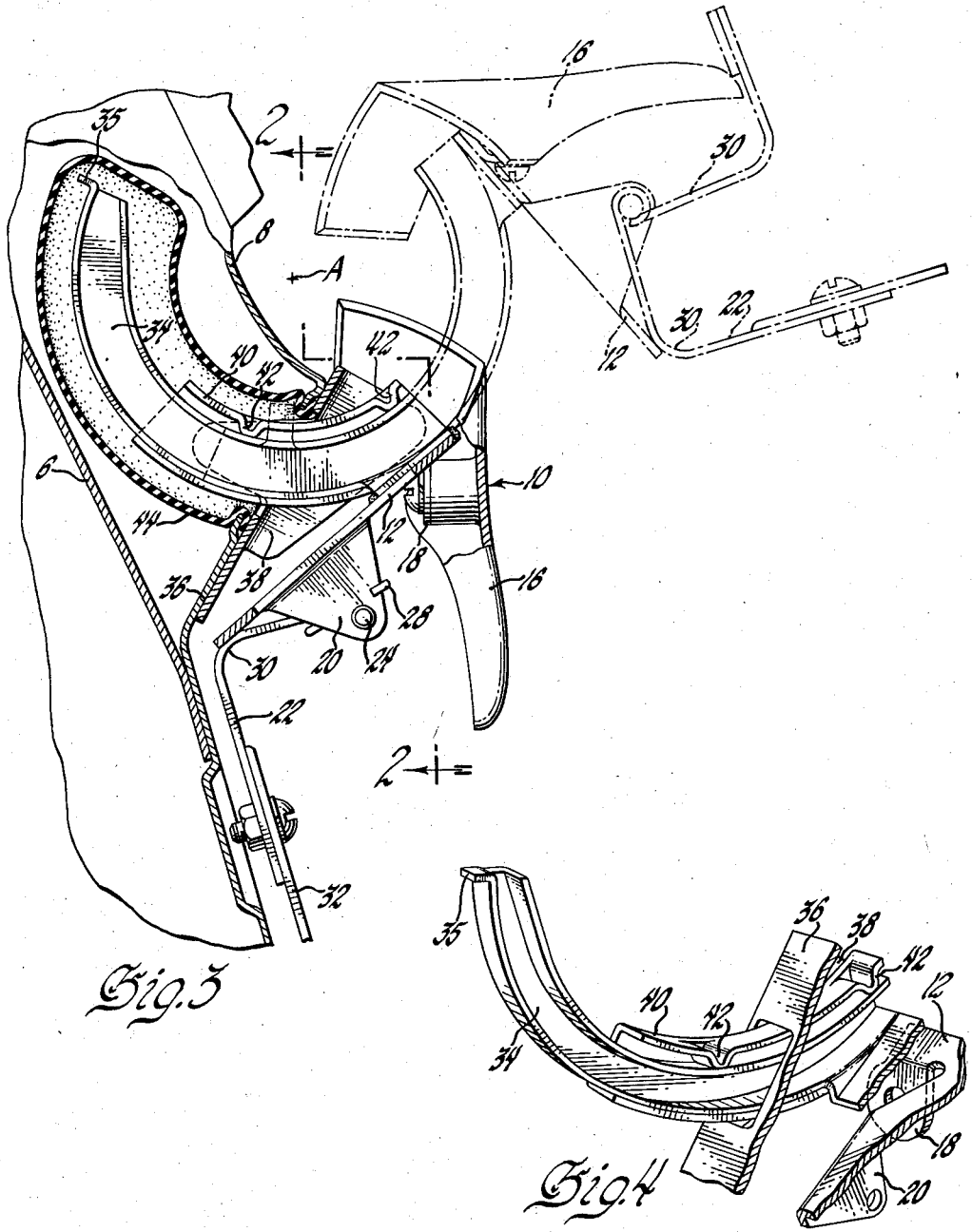

United States Patent Office 2,964,351
Patented Dec. 13, 1960

2,964,351

ADJUSTABLE LICENSE PLATE ASSEMBLY

Richard G. White, Oak Park, Mich., assignor to General Motors Corporation, Detroit, Mich., a corporation of Delaware Filed Aug. 25, 1958, Ser. No. 756,830

3 Claims. (Cl. 296—57)

This invention pertains to an adjustable license plate support assembly and, in particular, to such an assembly which is susceptible of having an axis of pivotal adjustment spaced beyond the structure on which the license plate support is to be mounted.

While it is desirable to use simple hinges for mounting certain license plate support assemblies, it is not always possible to obtain the desired pivotal license plate movement by using such hinges. Thus, to obtain such desired pivotal movement, the axis of pivotal adjustment may be in space beyond the vehicle.

It is, therefore, a general object and feature of this invention to provide an adjustable license plate assembly comprising support means cooperating with a vehicle body structure to establish any desired axis of license plate pivotal adjustment, even though such axis may lie in space beyond the vehicle body structure.

It is another object and feature of this invention to provide a relatively simple and inexpensive device of the type aforementioned which includes cooperating curved tracks respectively receiving therein support arms to establish any desired axis of pivotal adjustment of the license plate assembly, one or the other of the tracks or support arms being fixedly supported on the vehicle while the other is rigidly secured to a license plate holder or support.

It is a more specific object and feature of this invention to provide such an adjustable license plate assembly for the pivotally mounted tailgate of a vehicle, such as a station wagon, whereby the license plate assembly may be adjusted to and retained in any desired position relative to the vehicle tailgate as the latter is moved to any selected position between its fully opened and closed positions.

In general, these and other objects of this invention are attained in a structure comprising a pair of rigid curved or arcuate support tracks secured substantially interiorly of a vehicle body structure, such as a station wagon tailgate, and adapted to receive similarly curved rigid support arms secured to a holder on which a license plate is mounted. The aforementioned support tracks are provided with means which frictionally engage the support arms in order to maintain the license plate holder in any selected adjusted position. The curvature of the support tracks and arms may be selected to provide any desired degree or range of license plate adjustment even though the axis of such adjustment falls in space beyond the vehicle structure.

The nature of the structure which attains the objects aforementioned will become more apparent hereinafter as the description of the invention proceeds, and in which reference is made the following drawings in which:

Figure 3 is a view taken on line 3—3 of Figure 2, again partially broken away and in section to illustrate certain details; and Figure 4 is a fragmentary perspective view of certain parts of the structure.

Figure 1:
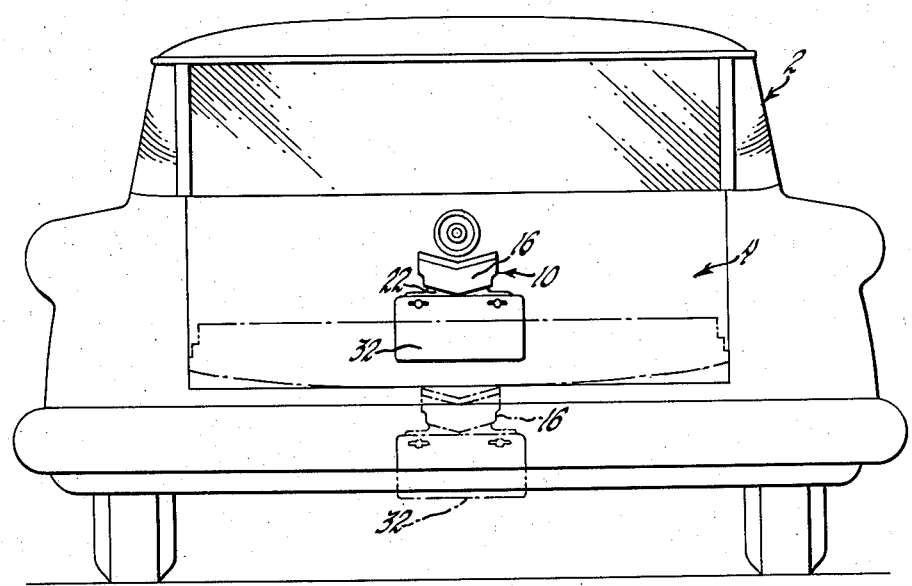
Figure 1 is a rear elevation of a station wagon equipped with the invention.
Figure 2:
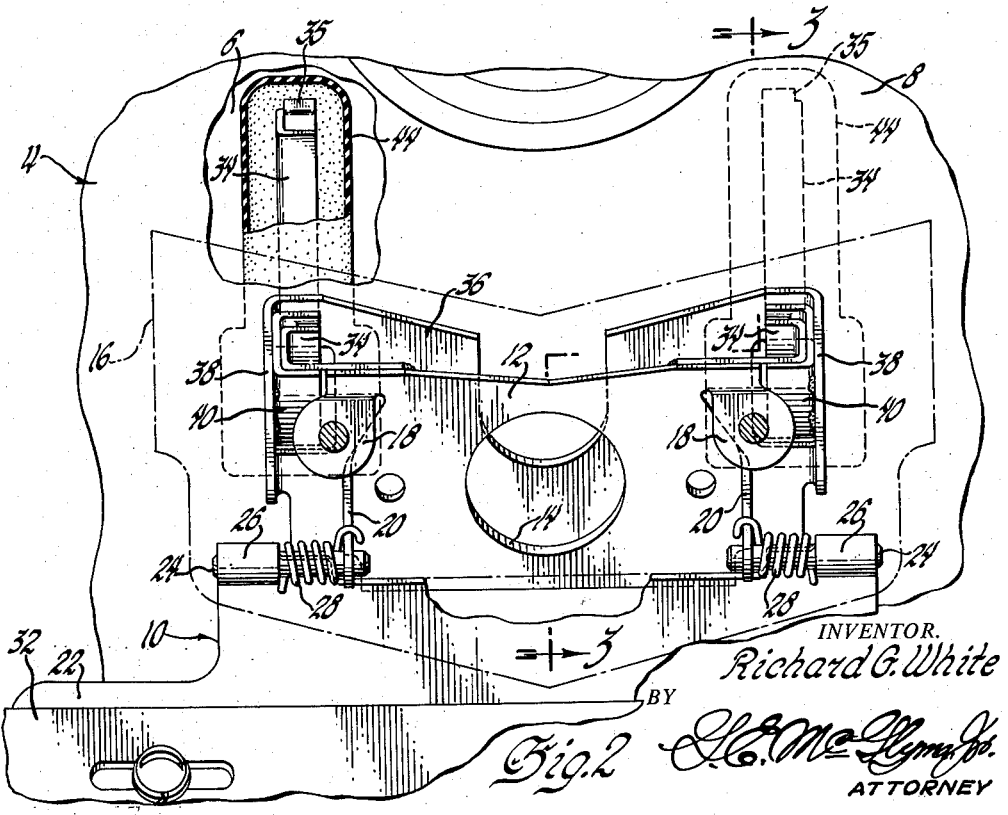
Figure 2 is a fragmentary enlarged view corresponding to Figure 1 and taken on line 2—2 of Figure 3, and in which parts are partially broken away and in section to illustrate certain details of the invention.

Referring now to the drawings, there is shown a vehicle 2, such as the well-known station wagon, having a tailgate 4 hinged in the usual manner on a transverse horizontal axis adjacent its lower edge for movement between the fully closed solid line and fully open dotted line positions of Figure 1. The tailgate includes the spaced transversely extending structural panel members 6 and 8. The license plate support assembly 10 is mounted on the tailgate 4.

The aforementioned assembly 10 includes a support plate or bracket 12 having a substantially centrally located aperture 14 in which a license plate lamp, not shown, may be suitably secured. A shield 16 may be suitably fixedly secured to the laterally spaced ears 18 of the support plate 12 so as to direct the major portion of the light from the license lamp toward the license plate. The support plate 12 is provided with a pair of laterally spaced rearwardly bent and projecting ears 20 to which the license plate holder 22 is adapted to hingedly be mounted. The aforementioned hinged mounting includes axially aligned hinge pins 24 secured to and extending between each of the ears 20 and a rolled flange 26 on each side of the holder 22 to define a horizontally extending transverse hinge axis. The springs 28 are mounted about the hinge pins 24, and each has its ends engaged with the respective ears 20 and holder 22 so as to normally urge the curved intermediate portion 30 of the holder into abutment with the support plate 12. The holder 22 is provided with the usual elongate openings receiving fastening means to mount the license plate 32 thereon. A pair of rigid curved or arcuate support arms 34 are suitably fixedly secured in laterally spaced relation on the rear face of the support plate 12, the terminal end of each arm being provided with a stop projection 35 for a purpose described below. As is clear from the drawings, each support arm 34 is substantially channel or U-shaped in cross section.

A mounting bracket 36 is suitably secured to the tailgate body panel 8, and includes a pair of laterally spaced rearwardly projecting flanges 38. Laterally spaced rigid curved or arcuate support tracks 40 are secured as by welding to the flanges 38 and project through a suitable opening in the bracket 36 and tailgate panel 8 into the space between the respective tailgate body panels. As will be apparent from the drawings, each support track is substantially channeled or U-shaped in cross section similar to the support arms 34 so as to telescopically receive or embrace the latter. Spaced tang members 42 are pierced inwardly of each track and frictionally engage the support arms 34. An elongate curved shroud or cover member 44 encloses each support arm 34, and is suitably secured to the tailgate panel 8 about the opening in the latter.

It will be appreciated that the license plate assembly will be disposed as shown in solid line in Figure 1 with the tailgate in its normal closed position. If it is desired to lower the tailgate partially or to the fully opened dotted line position of Figure 1, it will be apparent that the license plate support 12 must be pivoted to a new position depending from the tailgate if it is to be viewable from a trailing vehicle. Thus, prior to lowering the tailgate, the license plate support bracket 12 will be swung outwardly and away from the tailgate, while the support arms 34 slide within the support tracks 40. The assembly is then disposed in the dotted line position of Figure 3 with curved portion 30 of holder 22 abutting support bracket 12. The projection 35 at the terminal end of each of the arms 34 will cooperate with the end of the respective support track 40 to limit outward movement of the license plate support bracket 12. With the license plate assembly so adjusted, the tailgate may be lowered with the license plate disposed in a viewable position from the rear. Obviously, yieldable members 42 permit adjustment of the support arms while frictionally engaging and retaining the latter in any adjusted position.

After fully lowering the vehicle tailgate 4 subsequent to adjustment of the license plate assembly, it will be obvious that the license plate 32 may strike an obstruction while the vehicle travels over the roadway. It is for this reason that the spring hinge connection comprising pins 24 and springs 28 are provided to enable the license plate holder 22 to pivot upwardly from support bracket 12 as indicated in dotted line in Figure 3 to permit the obstruction to pass. Once the vehicle rides over the obstruction, the springs 28 return the holder 22 to the normal position with curved portion 30 thereof in abutment with support bracket or plate 12.

From the above description it will now be apparent that the above structure provides a hinge or pivot axis for a license plate mounting assembly which is not limited in its location by a specific body panel as would be the case with a simple hinge. Thus, once the particular degree or range of license plate adjustment is determined with reference to a particular hinge axis, suitably curved support tracks 40 and arms 34 may be selected so as to have a center of curvature corresponding to such hinge axis indicated at A in Figure 3.

I claim:

1. In combination with a pivotally mounted vehicle tail gate having spaced inner and outer body panels, an adjustably mounted license plate assembly; said assembly comprising an arcuate track secured to said outer body panel and extending interiorly of said tail gate between said body panels, said track having a center of curvature in space rearwardly beyond said outer body panel, a license plate holder on which a license plate may be mounted, an arcuate arm secured to said holder and adjustably engaged in said track, and means mounted in said track and frictionally engaging said arm to maintain said holder in a selected adjusted position.

2. In combination with a pivotally mounted vehicle tail gate having spaced inner and outer body panels, an adjustably mounted license plate assembly; said assembly comprising a rigid curved track mounted interiorly of said tail gate between said body panels and having a center of curvature in space rearwardly beyond said tail gate, said track being substantially U-shaped in cross section, a friction member mounted in said track, a license plate support, and a rigid curved arm secured to said license plate support and received within said track for adjustment about said center of curvature, said member frictionally engaging said arm to maintain the support in a selected adjusted position.

3. In combination with a pivotally mounted vehicle tail gate having spaced inner and outer body panels, an adjustably mounted license plate assembly; said assembly comprising a pair of rigid curved tracks mounted interiorly of said tail gate between said body panels and having a center of curvature in space rearwardly beyond the tail gate structure, each of said tracks being substantially U-shaped in cross section, a friction member mounted in each of said tracks, a license plate support, and a pair of rigid curved arms secured to said license plate support and received within said tracks for adjustment about said center of curvature, said members respectively frictionally engaging said arms to maintain said support in a selected adjusted position, a license plate pivotally mounted to said license plate support, and spring means normally urging said license plate into abutment with said support while permitting pivotal movement of said license plate away from said support.

References Cited in the file of this patent

UNITED STATES PATENTS

| 809,027   | Soss    | Jan. 2, 1906  |
| 1,532,481 | Forbes  | Apr. 7, 1925  |
| 2,160,485 | Obrecht | May 30, 1939  |
| 2,310,416 | Galamb  | Feb. 9, 1943  |
| 2,591,196 | Post    | Apr. 1, 1952  |
| 2,767,425 | Bradley | Oct. 23, 1956 |

FOREIGN PATENTS

| 425,634 | Great Britain | Mar. 19, 1935 |
| 495,603 | Great Britain | Nov. 16, 1938 |